(12) United States Patent
Banaugh et al.

(10) Patent No.: US 8,204,826 B2
(45) Date of Patent: *Jun. 19, 2012

(54) METHOD AND APPARATUS FOR INTEGRATED PAYMENTS PROCESSING AND DECISIONING FOR INTERNET TRANSACTIONS

(75) Inventors: Michelle Banaugh, Novato, CA (US); Peggy J. Fry, San Ramon, CA (US); David Potter, Fairfax, CA (US); George Luis Wood, Alamo, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/964,651

(22) Filed: Dec. 26, 2007

(65) Prior Publication Data
US 2008/0162317 A1    Jul. 3, 2008

Related U.S. Application Data

(63) Continuation of application No. 09/703,357, filed on Oct. 31, 2000, now Pat. No. 7,333,953.

(51) Int. Cl.
*G06Q 40/00* (2012.01)
(52) U.S. Cl. .......................................... 705/40; 705/39
(58) Field of Classification Search ............... 705/38–42
See application file for complete search history.

(56) References Cited

U.S. PATENT DOCUMENTS

| | | |
|---|---|---|
| 4,341,951 A | 7/1982 | Benton |
| 4,823,264 A | 4/1989 | Deming |
| 4,922,521 A | 5/1990 | Krikke et al. |
| 4,935,870 A | 6/1990 | Burk, Jr. et al. |
| 4,947,028 A | 8/1990 | Gorog |
| 4,977,595 A | 12/1990 | Ohta et al. |
| 4,982,346 A | 1/1991 | Girouard et al. |
| 4,992,940 A | 2/1991 | Dworkin |
| 5,025,373 A | 6/1991 | Keyser, Jr. et al. |
| 5,053,607 A | 10/1991 | Carlson et al. |
| 5,060,153 A | 10/1991 | Nakagawa |
| 5,077,607 A | 12/1991 | Johnson et al. |
| 5,175,682 A | 12/1992 | Higashiyama et al. |
| 5,177,342 A | 1/1993 | Adams |
| 5,220,501 A | 6/1993 | Lawlor et al. |
| 5,231,569 A | 7/1993 | Myatt et al. |
| 5,247,575 A | 9/1993 | Sprague et al. |
| 5,311,594 A | 5/1994 | Penzias |
| 5,321,751 A | 6/1994 | Ray et al. |
| 5,326,959 A | 7/1994 | Perazza |
| 5,336,870 A | 8/1994 | Hughes et al. |

(Continued)

FOREIGN PATENT DOCUMENTS

EP    0 803 827 A2    10/1997

(Continued)

OTHER PUBLICATIONS

O'Mahony D., et al., Electronic Payment Systems, Artech House, Inc., 1997 pp. 61-83.

(Continued)

*Primary Examiner* — Hani M Kazimi
(74) *Attorney, Agent, or Firm* — Merchant & Gould P.C.

(57) ABSTRACT

A method and apparatus provides a decisioning solution for merchants accepting Internet transactions, integrated with means for processing payments electronically. The invention claimed herein provides features, such as, but not limited to, electronic transfer of funds, authentication of parties, seemless integration with merchant's Web page, and reporting of suspicious activity.

14 Claims, 1 Drawing Sheet

U.S. PATENT DOCUMENTS

| | | | |
|---|---|---|---|
| 5,341,429 A | 8/1994 | Stringer et al. | |
| 5,347,632 A | 9/1994 | Filepp et al. | |
| 5,351,186 A | 9/1994 | Bullock et al. | |
| 5,351,293 A | 9/1994 | Michener et al. | |
| 5,361,201 A | 11/1994 | Jost et al. | |
| 5,377,269 A | 12/1994 | Heptig et al. | |
| 5,383,113 A | 1/1995 | Kight et al. | |
| 5,386,104 A | 1/1995 | Sime | |
| 5,412,190 A | 5/1995 | Josephson et al. | |
| 5,414,833 A | 5/1995 | Hershey et al. | |
| 5,465,206 A | 11/1995 | Hilt et al. | |
| 5,475,585 A | 12/1995 | Bush | |
| 5,483,445 A | 1/1996 | Pickering | |
| 5,484,988 A | 1/1996 | Hills et al. | |
| 5,496,991 A | 3/1996 | Delfer, III et al. | |
| 5,500,513 A | 3/1996 | Langhans et al. | |
| 5,530,438 A | 6/1996 | Bickham et al. | |
| 5,532,464 A | 7/1996 | Josephson et al. | |
| 5,557,518 A | 9/1996 | Rosen | |
| 5,590,197 A | 12/1996 | Chen et al. | |
| 5,596,642 A | 1/1997 | Davis et al. | |
| 5,596,643 A | 1/1997 | Davis et al. | |
| 5,604,802 A | 2/1997 | Holloway | |
| 5,621,797 A | 4/1997 | Rosen | |
| 5,623,547 A | 4/1997 | Jones et al. | |
| 5,642,419 A | 6/1997 | Rosen | |
| 5,649,114 A | 7/1997 | Deaton et al. | |
| 5,649,117 A | 7/1997 | Landry | |
| 5,652,786 A | 7/1997 | Rogers | |
| 5,680,305 A | 10/1997 | Apgar, IV | |
| 5,684,965 A | 11/1997 | Pickering | |
| 5,691,524 A | 11/1997 | Josephson | |
| 5,696,907 A | 12/1997 | Tom | |
| 5,696,909 A | 12/1997 | Wallner | |
| 5,699,528 A | 12/1997 | Hogan | |
| 5,710,889 A | 1/1998 | Clark et al. | |
| 5,715,298 A | 2/1998 | Rogers | |
| 5,715,314 A | 2/1998 | Payne et al. | |
| 5,717,868 A | 2/1998 | James | |
| 5,724,424 A | 3/1998 | Gifford | |
| 5,745,654 A | 4/1998 | Titan | |
| 5,748,737 A | 5/1998 | Daggar | |
| 5,750,972 A | 5/1998 | Botvin | |
| 5,757,917 A | 5/1998 | Rose et al. | |
| 5,758,327 A | 5/1998 | Gardner et al. | |
| 5,783,808 A | 7/1998 | Josephson | |
| 5,799,087 A | 8/1998 | Rosen | |
| 5,801,366 A | 9/1998 | Funk et al. | |
| 5,812,668 A | 9/1998 | Weber | |
| 5,815,657 A | 9/1998 | Williams et al. | |
| 5,819,226 A | 10/1998 | Gopinathan et al. | |
| 5,826,245 A | 10/1998 | Sandberg-Diment | |
| 5,832,463 A | 11/1998 | Funk | |
| 5,848,400 A | 12/1998 | Chang | |
| 5,850,446 A | 12/1998 | Berger et al. | |
| 5,870,456 A | 2/1999 | Rogers | |
| 5,870,721 A | 2/1999 | Norris | |
| 5,870,724 A | 2/1999 | Lawlor et al. | |
| 5,873,072 A | 2/1999 | Kight et al. | |
| 5,884,290 A | 3/1999 | Smorodinsky et al. | |
| 5,889,863 A | 3/1999 | Weber | |
| 5,890,140 A | 3/1999 | Clark et al. | |
| 5,892,900 A | 4/1999 | Ginter et al. | |
| 5,893,080 A | 4/1999 | McGurl et al. | |
| 5,898,154 A | 4/1999 | Rosen | |
| 5,905,736 A | 5/1999 | Ronen et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,629 A | 7/1999 | Rosen | |
| 5,920,847 A | 7/1999 | Kolling et al. | |
| 5,930,776 A | 7/1999 | Dykstra et al. | |
| 5,931,917 A | 8/1999 | Nguyen et al. | |
| 5,936,219 A | 8/1999 | Yoshida et al. | |
| 5,936,221 A | 8/1999 | Corder et al. | |
| 5,943,424 A | 8/1999 | Berger et al. | |
| 5,943,656 A | 8/1999 | Crooks et al. | |
| 5,949,045 A | 9/1999 | Ezawa et al. | |
| 5,949,876 A | 9/1999 | Ginter et al. | |
| 5,953,423 A | 9/1999 | Rosen | |
| 5,956,700 A | 9/1999 | Landry | |
| 5,963,648 A | 10/1999 | Rosen | |
| 5,963,924 A | 10/1999 | Williams et al. | |
| 5,963,925 A | 10/1999 | Kolling et al. | |
| 5,970,475 A | 10/1999 | Barnes et al. | |
| 5,978,840 A | 11/1999 | Nguyen et al. | |
| 5,982,891 A | 11/1999 | Ginter et al. | |
| 5,983,207 A | 11/1999 | Turk et al. | |
| 5,983,208 A | 11/1999 | Haller et al. | |
| 5,987,132 A | 11/1999 | Rowney | |
| 5,996,076 A | 11/1999 | Rowney et al. | |
| 5,999,625 A | 12/1999 | Bellare et al. | |
| 6,002,767 A | 12/1999 | Kramer | |
| 6,014,645 A | 1/2000 | Cunningham | |
| 6,016,484 A | 1/2000 | Williams et al. | |
| 6,021,202 A | 2/2000 | Anderson et al. | |
| 6,026,379 A | 2/2000 | Haller et al. | |
| 6,029,149 A | 2/2000 | Dykstra et al. | |
| 6,029,150 A | 2/2000 | Kravitz | |
| 6,029,152 A | 2/2000 | Bublitz et al. | |
| 6,029,154 A | 2/2000 | Pettitt | |
| 6,032,133 A | 2/2000 | Hilt et al. | |
| 6,036,344 A | 3/2000 | Goldenberg | |
| 6,044,362 A | 3/2000 | Neely | |
| 6,047,067 A | 4/2000 | Rosen | |
| 6,047,268 A | 4/2000 | Bartoli et al. | |
| 6,047,887 A | 4/2000 | Rosen | |
| 6,049,793 A | 4/2000 | Tomita | |
| 6,052,671 A | 4/2000 | Crooks et al. | |
| 6,052,675 A | 4/2000 | Checchio | |
| 6,072,870 A | 6/2000 | Nguyen et al. | |
| 6,119,105 A | 9/2000 | Williams | |
| 6,138,107 A | 10/2000 | Elgamal | |
| 6,163,772 A | 12/2000 | Kramer et al. | |
| 6,178,409 B1 | 1/2001 | Weber et al. | |
| 6,188,994 B1 | 2/2001 | Egendorf | |
| 6,253,027 B1 | 6/2001 | Weber et al. | |
| 6,253,193 B1 | 6/2001 | Ginter et al. | |
| 6,283,366 B1 | 9/2001 | Hills et al. | |
| 6,304,915 B1 | 10/2001 | Nguyen et al. | |
| 6,324,525 B1 | 11/2001 | Kramer et al. | |
| 6,330,546 B1 | 12/2001 | Gopinathan et al. | |
| 6,341,353 B1 | 1/2002 | Herman et al. | |
| 6,363,363 B1 | 3/2002 | Haller et al. | |
| 6,363,488 B1 | 3/2002 | Ginter et al. | |
| 6,373,950 B1 | 4/2002 | Rowney | |
| 6,389,402 B1 | 5/2002 | Ginter et al. | |
| 6,408,284 B1 | 6/2002 | Hilt et al. | |
| 6,412,092 B1 | 6/2002 | Raghunath | |
| 6,427,140 B1 | 7/2002 | Ginter et al. | |
| 6,609,114 B1 | 8/2003 | Gressel et al. | |
| 6,629,081 B1 | 9/2003 | Cornelius et al. | |
| 6,640,304 B2 | 10/2003 | Ginter et al. | |
| 7,333,953 B1 | 2/2008 | Banaugh et al. | |
| 2001/0010046 A1 | 7/2001 | Muyres et al. | |
| 2001/0042016 A1 | 11/2001 | Muyres et al. | |
| 2001/0056405 A1 | 12/2001 | Muyres et al. | |
| 2002/0002488 A1 | 1/2002 | Muyres et al. | |
| 2002/0004744 A1 | 1/2002 | Muyres et al. | |
| 2002/0010679 A1 | 1/2002 | Felsher | |
| 2002/0032612 A1 | 3/2002 | Williams et al. | |
| 2002/0048369 A1 | 4/2002 | Ginter et al. | |
| 2002/0073043 A1 | 6/2002 | Herman et al. | |
| 2002/0112171 A1 | 8/2002 | Ginter et al. | |
| 2003/0088784 A1 | 5/2003 | Ginter et al. | |
| 2003/0105721 A1 | 6/2003 | Ginter et al. | |
| 2003/0140007 A1 | 7/2003 | Kramer et al. | |
| 2003/0163431 A1 | 8/2003 | Ginter et al. | |
| 2003/0191719 A1 | 10/2003 | Ginter et al. | |
| 2004/0054630 A1 | 3/2004 | Ginter et al. | |
| 2006/0010070 A1 | 1/2006 | Banaugh et al. | 705/40 |
| 2006/0074799 A1 | 4/2006 | Averyt et al. | 705/40 |
| 2006/0089906 A1 | 4/2006 | Rowley | 705/40 |

FOREIGN PATENT DOCUMENTS

| | | |
|---|---|---|
| EP | 0 992 952 A2 | 4/2000 |
| EP | 1 085 443 A2 | 3/2001 |

| | | |
|---|---|---|
| EP | 1 029 311 | 6/2001 |
| EP | 1 115 095 A2 | 7/2001 |
| EP | 1 256 864 A1 | 11/2002 |
| EP | 1 265 200 A1 | 12/2002 |
| EP | 1 265 202 A1 | 12/2002 |
| EP | 1 153 375 B1 | 1/2003 |
| EP | 0 944 879 B1 | 12/2003 |
| JP | 02002157537 A | 5/2002 |
| WO | WO 92/10901 | 6/1992 |
| WO | WO 93/03446 | 2/1993 |
| WO | WO 98/37675 | 8/1998 |
| WO | WO 98/58339 | 12/1998 |
| WO | WO 99/18529 | 4/1999 |
| WO | WO 00/33221 | 6/2000 |
| WO | WO 00/36570 | 6/2000 |
| WO | WO 00/57330 | 9/2000 |

OTHER PUBLICATIONS

Anderson, R. et al., "NetCard—A Practical Electronic Cash System," *Proceedings of the International Workshop on Security Protocols*, pp. 49-57 (1996).

Bellare, M. et al., "VarietyCash: A Multi-purpose Electronic Payment System," *Proceedings of the 3rd Usenix Workshop on Electronic Commerce*, pp. 1-21 (1998).

Blazing a Trail in Point of Sale Truncation, *American Banker*, vol. CLXII, No. 123, p. 16, 1 page Abstract (Jun. 27, 1997).

Bodendorf, F. et al., "Internet Based Self Service Systems for Customer-oriented Processes in Public Administration," *Proceedings of the 8th European Conference on Information Systems*, Vienna, Austria, pp. 1131-1135, 1 page Abstract (Jul. 3-5, 2000).

Bodendorf, F. et al., "Secure Internet-Based Transactions for Public Services," *Proceedings of the ISCA 16th International Conference Computers and their Applications*, Seattle, Washington, pp. 429-432, 1 page Abstract (Mar. 28-30, 2001).

Fera, L. et al., "Digital Cash Payment Systems," pp. 1-21 (Dec. 6, 1996).

Knorr, E., "On Digital Money and Card Technologies," pp. 1-24 (Jan. 20, 1997).

Lee, J, "A Resilient Access Control Scheme for Secure Electronic Transactions, " *Proceedings of the 3rd USENIX Workshop on Electronic Commerce*, Boston, Massachusetts, pp. 75-82, 1 page Abstract (Aug. 31-Sep. 3, 1998).

Lin, W., "A Mobile-based Marketing Information Management System," *Proceedings 16th IEEE Symposium on Computer-Based Medical Systems*, New York, New York, pp. 219-224, 1 page Abstract (Jun. 26-27, 2003).

Madigan, P, Pays to Change (Automated Payments), *CA Magazine*, vol. 97, No. 1041 p. 50-2, 1 page Abstract (Apr. 1993).

Mao, W., "On Cryptographic Techniques for Online Bankcard Payment Transactions Using Open Networks," *Security Protocols, International Workshop Proceedings*, Cambridge, United Kingdom, pp. 1-17, 1 page Abstract (Apr. 10-12, 1996).

Mao, W., On Two Proposals for On-line Bankcard Payments Using Open Networks: Problems and Solutions, *Proceedings 1996 IEEE Symposium on Security and Privacy*, Oakland, California, pp. 201-210, 1 page Abstract (May 6-8, 1996).

McDonald, D. et al., "Just Talk to Me: A Field Study of Expertise Location," *Proceedings of the 1998 ACM Conference on Computer Supported Cooperative Work (CSCW '98)*, Seattle, Washington, pp. 1-11 (Nov. 14-18, 1998).

Medvinsky, G. et al., "Electronic Currency for the Internet," *EM-Electronic Markets*, No. 9-10, pp. 23-24 (Oct. 1993).

Medvinsky, G. et al., "NetCash: A design for practical electronic currency on the Internet," Proceedings of the First ACM Conference on Computer and Communications Security, pp. 1-5 (Nov. 1993).

Moroshima, S. et al., "Hitachi Commerce Solution: Total Solution for Electronic Commerce," *Hitachi Review*, vol. 46, No. 4, pp. 189-192, 1 page Abstract (Aug. 1997).

Puttre, J., "Can Internet Standards Bring EDI to Everyone?" *Business Communications Review*, vol. 27, Issue 8, 5 pages (Aug. 1997).

Utility Industry Group Implementation Standard for Electronic Data Exchange, *Utility Industry Group*, 850 Purchase Order Ver/Rel 004010, 54 pages (Oct. 7, 1999).

Wells Fargo Online Merchant Services, http://wellsfargosecure.com/ 1 page (Copyright 1999-2005).

METHOD AND APPARATUS FOR INTEGRATED PAYMENTS PROCESSING AND DECISIONING FOR INTERNET TRANSACTIONS

CROSS-REFERENCE TO RELATED APPLICATION

This application is a continuation of U.S. patent application Ser. No. 09/703,357 filed on Oct. 31, 2000 now U.S. Pat. No. 7,333,953 which is incorporated herein, in its entirety, by reference hereto.

BACKGROUND OF THE INVENTION

1. Technical Field

The present invention relates to Internet transactions and the consequent collection of funds. More particularly, the present invention relates to a method and apparatus for providing an integrated decisioning solution for merchants accepting Internet transactions with processing payments electronically.

2. Description of the Prior Art

While traditional payment systems, such as, for example, gateways with credit cards, continue to dominate the majority of Internet payments, a growing number of payment alternatives has developed. Alternative systems allow merchants to easily receive payments from a variety of sources including, for example, checking accounts, credit cards, lines of credit, and cyber-value.

Large established merchants, such as, for example, Wells Fargo, Card Services International, Bank of America, and Chase, generally use payment gateways and software combination with merchant acquirers to accept credit cards and electronic checks (eChecks) from an Automated Clearing House (ACH).

Medium sized merchants also use payment gateways and merchant acquirers. Some medium and larger sized merchants also accept cyber-value through affiliate marketing programs. For example, Blockbuster and Omaha Steaks accept cyber-value through Beenz, and GiftCertificates.com accepts cyber-value through Yahoo Points.

Smaller sized merchants, auction sellers, and individuals turn to person-to-person (P2P) payment solutions. Most solutions require pre-funding a stored-value account, then initiating payment from the stored-value account. For example, PayPal, YahooPayDirect, and Billpoint use store-valued accounts.

Micro-payment merchants, such as, for example, digital goods, services, and subscriptions, are using payment aggregators to manage transactions over a period of time, and then process and settle at the end of the period. For example, The Wall Street Journal and the New York Times use Q-Pass for billing to credit cards, and Ezone and Hometips.com use e-Charge for billing to phone bills.

PayPal has been dominant P2P payment system for several reasons, cited herein below:

Viral Marketing. PayPal pays new users $5.00 and also pays $5.00 per referral. Originally PayPal paid $10 for new members and referrals but lowered the amount to $5.00 after they acquired over 1 million users. Additional limitations to qualify for the referral fee have been implemented recently by PayPal. To qualify for the referral fee, a consumer has to register as a Business/Premier account or post $50 to the PayPal account via a checking account direct debit. Some auction sellers advertise free items for users using PayPal. The seller can get $5.00 for referrals if the previously mentioned qualifications are met.

Free transaction processing. PayPal previously did not charge individuals to fund the account or to receive money. Recently, PayPal announced a fee increase for their payment services. Free consumer accounts now have limited transaction amounts. If the transaction limit are exceeded, the account is charged based on the Business/Premier account price structure.

Simple sign up and product use. Sign up requires name, address, e-mail address, and a funding source, such as a credit card number or a bank account number. Users can easily request money from any person with an e-mail address. Auction sellers and small merchants can simply add a PayPal button to enable them to accept payments.

Adapts quickly to meet market concerns and opportunities. In response to a few fraud scenarios, PayPal claims that they acted quickly to address system and process deficiencies. For example, PayPal now claims that a PayPal buyer using a credit card is now afforded all of the same rights that a credit card consumer with a dispute is provided. Also PayPal now requires better verification of bank account ownership before transferring money from the bank account via the ACH.

Although PayPal currently offers certain services for free, they had originally announced plans to make money through several initiatives as cited herein below:

Transaction Fees. PayPal previously provided free limited service to individuals, but charges users for additional features and premium services. See Table A herein below for details.

Credit Card Fees. PayPal, through X.com, claimed that they were going to be offering debit and credit cards to its customers. An X.com credit card would have been as on-us, whereby the issuer, X.com, would have received interchange from the merchant, PayPal. A debit card would have allowed X.com to receive interchange from POS purchases in addition to fees for using ATMs to withdraw cash. Recent management changes at X.com have changed the strategy of the company. X.com had previously claimed that they were going to provide comprehensive financial services however, due to recent management changes the company's strategy will be focused on being a payment provider.

Currency Exchange Fees. PayPal previously claimed that they would provide international payment options with a 1.5% fee for currency exchange.

Float Income. PayPal claims to have a $20 average balance in each PayPal account at any given time.

Banking Revenue. PayPal previously planned to migrate some PayPal accounts to X.com bank accounts with applicable banking service fees.

Brokerage and Other Revenue. PayPal previously had planned to convert some accounts to X.com brokerage accounts with applicable brokerage service fees.

Table A herein below shows the different types of services provided by PayPal.

TABLE A

| Free Services | Business/Premium Services | Premium Service Fees |
| --- | --- | --- |
| Open an account | Receive Money | Approx. 1.9% plus transaction fees depending on |

TABLE A-continued

| Free Services | Business/Premium Services | Premium Service Fees |
|---|---|---|
| Send Money | Nightly Sweep | transaction dollar amount. 0.6% |
| Receive Money | Download data into Excel | Included |
| $100,000 Insurance | $100,000 Insurance | Included |
| | Instant Purchase and automatic payment requests for websites and auctions | Included |
| | Accept unlimited credit card payments | Included |
| | Batch Payment Service | Lesser of 2% or $0.25/payment |
| | 24/7 Customer Service | Included |

Although many alternative payment solutions have been developed, none of them offers an integrated comprehensive suite of products to address both consumer and merchant demands for safe, convenient, and inexpensive electronic commerce (e-commerce).

It would be advantageous to provide an integrated comprehensive suite of products that addresses both consumer and merchant demands for safe, convenient, and inexpensive electronic commerce (e-commerce).

It would be advantageous to provide an integrated comprehensive suite of products that interfaces with a merchant's Web page seamlessly, as a plug and play product, including allowing for a single-sign on process for the consumer.

It would be advantageous to provide an integrated comprehensive suite of products to address both consumer and merchant demands for safe, convenient, and inexpensive e-commerce that handles transactions based on echecks, as well as credit cards.

It would be advantageous to provide an integrated comprehensive suite of products to address both consumer and merchant demands for safe, convenient, and inexpensive e-commerce that uses a message architecture matching the ACH message to the original transaction.

SUMMARY OF THE INVENTION

A method and apparatus provides a decisioning solution for merchants accepting Internet transactions, integrated with means for processing payments electronically. The invention claimed herein provides for electronic transfer of funds, authentication of parties, exception handling, reconciliation of funds, seamless integration with merchant's Web page, reporting of suspicious activity, approval for shipment of goods and services by merchant to indicate to seller, and a decision for merchant to transact with a buyer based on a determined risk of the buyer.

DETAILED DESCRIPTION OF THE INVENTION

A method and apparatus provides a decisioning solution for merchants accepting Internet transactions, integrated with means for processing payments electronically. The invention claimed herein provides for electronic transfer of funds, authentication of parties, exception handling, reconciliation of funds, seamless integration with merchant's Web page, reporting of suspicious activity, approval for shipment of goods and services by merchant to indicate to seller, and a decision for merchant to transact with a buyer based on a determined risk of the buyer.

In the preferred embodiment, the invention provides an Internet payment alternative to credit cards and paper checks. Credit card fees are costly for sellers, and white paper checks are a hassle to write, and delay payment and receipt of goods. The invention claimed herein acts as the ACH processor for the cited effort, as well as mitigates risk in the virtual world. The invention herein makes decisions regarding eCheck transactions and consumer enrollment. The potential for use of the invention claimed herein is immeasurable, in view of consumers becoming more Internet savvy and look to simple solutions for payments over the Internet.

It is noted that herein the terms consumer, end-consumer, buyer and/or seller, can be used interchangeably, and the terms registration and enrollment are used herein interchangeably.

Electronic Transfer of Funds.

In the preferred embodiment, transactions from consumer to consumer; consumer to business, and business to business are provided. It can be appreciated that capability can be extended for multiple consumers and multiple businesses, i.e. from one seller to multiple buyers, and from one buyer to multiple sellers.

In the preferred embodiment, electronic transfer of funds is facilitated by message units. Typical information in a message unit for transfer of funds comprises, but is by no means limited to, purchase information, seller information, shipping data information, auction information, buyer entered data, source generated data, client maintained data, buyer data, DDA information, and additional credit card processing information.

Authentication of Parties.

In the preferred embodiment, the registration or enrollment feature of the claimed invention herein takes basic information from both the buyer and the seller such that neither has to re-enter the same information at a later time. That is, information from the registration feature is stored. The registration process is binary in that either a yes or no is determined. If the result is no, then the end-consumer may not use a merchant's product. Otherwise, the end-consumer is considered an approved seller or buyer.

In the preferred embodiment, when enrollment or registration requests are made, risk assessment methods and criteria are available. Risk assessments specifically affect processing of enrollments where an indicator, such as, for example, an entitlement flag indicate that eCheck processing is enabled. Seller categorization can also be based on such a list of assessments.

In the preferred embodiment, when enrollment related message units are received by the invention herein, all data from the message units, as well as any standardized fields, are stored and facilitate building in indices to speed search times in subsequent searches.

Echeck Purchases.

In the preferred embodiment, purchase requests via eCheck require an immediate decision and a 5 second response returned to the customer. It can be appreciated that the invention claimed herein can incorporate a variety of methods implementing logic to support eCheck purchases. An online decision engine triggers the performance of a number of risk assessments. Each assessment is assigned a unique risk assessment identifier (ID). The ID allows subsequent identification of which risk assessments passed and which risk assessments failed. The assessment methods for generating the risk assessment ID's assure uniqueness.

In the preferred embodiment, a hierarchy of assessments is used under specific situations, such as, for example, eCheck purchases, or enrollment requests. For example, assessing if an end-consumer is too good to be true, can be performed when a buyer is enrolling in the customer's system to perform a transaction. In contrast, cross-checking a file containing known bad buyer identifiers can be performed in addition to the too good to be true assessment when an eCheck purchase is requested. It can be appreciated that the scope of the invention is not limited to these two types of risk assessment described herein above, nor even to types such as these cited.

In another embodiment, risk assessment can also be performed using an external vendor, such as, for example, Fraud-Scan Plus, offered by Equifax/RiskWise. The vendor product scans and checks various elements in an inquiry seeking inconsistencies, inaccuracies, and/or previously misused elements. Results are returned to the decision driver of the claimed invention herein for interpretation. Cost relating to using third party vendors can affect rules in their use. The invention claimed herein accommodates using third party vendors and their subsequent usage guided by business rules.

In one embodiment, the results from a third party risk assessment vendor as described herein above is used as part of the 5 second lookup.

In the preferred embodiment, individual risk assessment identifiers and results are stored and are accessible for future review and analysis.

In the preferred embodiment of the risk assessment feature, the following apply. Total time for registration is real-time, or kept under 5 seconds. Manual review and overrides by analysts are allowed. That is, credit analysts need the ability to review the decisions and manually override decisions. Overriding is on an exception basis and does not require an extensive user interface. Rather, the analyst can review a customer file, and can have access to an override field and a comment field. User adjustment of risk element weighting is allowed. User defined risk element tables, rather than hard coded risk weighting are used.

Due to marketing pushes and current eCommerce momentum, the invention claimed herein, in the preferred embodiment, is robust and can handle extremely heavy application usage. For example, the invention claimed herein should accommodate 10,000 decisions per hour, but is by no means limited to accodating that amount. The invention should incorporate a queing functionality for unlikely scenarios when application usage exceeds capacity. The invention claimed herein should comprise multiple access points to the decision engine, so that multiple external partners or customers can access separate regions of the decision engine simultaneously.

In the preferred embodiment, the invention retrieves any negative activity or history based on proprietary data banks. Based on the information collected, the 5 second lookup fraud method decides whether an eCheck transaction is declined or placed in a pending status. The method sends a pass or fail response including reasons for declines to the customer. Possible reasons for declines comprise, but are by no means limited to: aborted reasons, such as customer's front-end declines concerning authentication, credit, or fraud risk; decision reasons, such as, for example, failure to authenticate; ACH reasons, such as, for example, insufficient funds, account closed, invalid account number, no prenotification on file, and the like; and notification of change (NOC) reasons, wherein NOC further provides information necessary to correct the transaction, such as, for example, incorrect DFI account number, wherein the correct DFI account number appears in a corrected data field.

It can be appreciated that the registration process can be adapted to accommodate international registrations. For example, tables of international codes and storage of countries codes wherein the countries are considered high risk can be employed in the invention claimed herein.

In the preferred embodiment, valid transaction data is ensured prior to running any individual risk assessments. For example, no risk assessments are performed when any of the following are returned: insufficient data provided, invalid data provided, or international transaction are not supported.

The preferred embodiment facilitates authentication of parties for both a one-time transaction or for ongoing transactions.

The preferred embodiment protects consumer information by encrypted messaging.

In the preferred embodiment, as each risk assessment response is returned to the online decision engine, both the risk assessment ID and the risk assessment result are logged. After all risk assessments are complete, the responses are evaluated. For example, if all risk assessments are passes, then the decision is an accept. If any individual risk assessment fails, then the decision for the transaction is a decline. It can be appreciated that decision logic becomes more complicated as additional risk assessments are added to a given set of risk assessments.

In the preferred embodiment, seller category assignment is based on four factors, but is not limited to the four factors: a risk decision, gross monthly volume of the seller, length of time the seller has been with customer, and the customer feedback rating. The preferred embodiment also handles processing of enrollment profile changes, processing of failed enrollments, processing of enrollment overrides, and delayed risk assessment condition, wherein delayed results are captured for possible use by an intra-day fraud engine.

In another preferred embodiment, special processing is required for special category assignment for pre-approved and other special promotions.

Handling Exceptions Between Two Parties.

The exception handling process comprises returned item processing for electronic checks and charge back item processing for credit card transactions.

In the preferred embodiment, only very basic user interface functionality is required using, such as, for example, mainframe CICS screens, or browser-based user interface screens. As other functions are completed, users will need additional user interface capabilities. At a minimum, users should have the ability to:

Reverse an eCheck transaction that is waiting to be released to ACH; and

Refund a buyer some specified amount for an eCheck purchase.

In the preferred embodiment, when a specific eCheck transaction is targeted for special action, the user experiences the following:

1) The user logs into the appropriate area of the processing environment. Rules for login ID convention should be established, e.g. e-mail address, mainframe ID, and the like.
2) The user is authorized to take action on purchase transactions before granted access to user interface screens.
3) The user selects the desired function.
4) The user input an order ID of the transaction that needs to be stopped or refunded.

5) The user views relevant information about that transaction, such as, for example, the following, but is by no means limited to the following:
   a) Order ID;
   b) Auction number;
   c) Buyer's Client User ID;
   d) Buyer's merchant ID;
   e) Buyer name;
   f) Status of the transaction, e.g. already sent to ACH, ACH Return received, past 3-day window, and the like;
   g) Date/time stamp the transaction was originally received;
   h) Amount of the original transaction; and
   i) Balance on the transaction (less previous refunds, etc.).
6) The user confirms that the correct transaction and action have been selected by choosing either to execute or cancel the action against the transaction.
7) The invention completes the desired action: Reversal or Refund.
   a) If eCheck Reversal:
      The user is prompted to enter the following:
         Reason code for the reversal; and
         Reason text for the reversal;
      The reversal function is executed;
      After the transaction has been executed, a confirmation message is displayed on the screen, as well as a reminder of manual tasks which may need to be completed, e.g. contacting the merchant;
      If the reversal can not be executed for any reason, e.g. the transaction is already released to ACH, an appropriate message is displayed.
   b) If eCheck Refund:
      The user is prompted to enter the following:
         Amount of refund request;
         The refund type that indicates the accounting and other requirements for the refund, e.g. seller initiated='SI', and Buyer-Only Refund (Fraud)= 'BO';
         Reason code for refund;
         Reason text for refund;
      The refund function is executed;
      After the transaction has been executed, a confirmation message is displayed on the screen, as well as a reminder of manual tasks which may need to be completed, e.g. contacting the merchant. The manual tasks may vary depending on the specific refund type selected;
      If the refund could not be executed for any reason, e.g. purchase already refunded up to limit, and an ACH Return received, an appropriate message is displayed;
8) The user has the option to return to the main menu or to logoff; and
9) The user may initiate multiple reversals or refunds until they elect to logoff.

Impact to a Merchant.

In the preferred embodiment, merchant databases are updated whenever a change is made to any purchase transaction. The merchant is notified whenever the decision engine initiates any action against an eCheck purchase. In another embodiment, users are able to update the merchant's financial and fraud databases directly via thirdparty vendors, such as, for example, Carepoint/Fraudpoint.

In the case of seller Initiated refunds, the merchant can process a seller refund and subsequent ACH credit to the buyer through a message unit interface to the decision engine.

Interface.

Other embodiments of the invention use Intranet or Internet based user interface screens, click-on buttons, and pull down menus for user selections.

Functionality.

Other embodiments of the invention comprise any of the following functionality:
   Different screens for seller initiated vs. fraud related refunds;
   Fraud Notification Messages to the merchant or partner;
   Ability to search for purchase transactions based on multiple, full or partial field matches;
   Ability to search for enrollment records based on multiple, full or partial field matches;
   i-Fraud Database management (enter, change, delete records; create field types);
   Auto-stop function, wherein the user enters a transaction to be stopped, the system determines its position in payment cycle, and selects the appropriate function to execute;
   Charge back recovery management; and
   User access control screens.

Reconcile Funds.

Herein below, the terms partner and merchant can be used interchangeably. Reconciling funds comprises funds disbursement for approved transactions. Disbursements can include international disbursements, such as, for example, for Canadian transactions and other international currencies.

Real-time Processing

It can be appreciated that the invention herein can be extended to comprise real-time debit of funds for electronic check transactions, otherwise known as guaranteed hold on funds (in lieu of ACH processing)

Online Seller Disbursements.

In the preferred embodiment, once the seller advises the partner that the product has been shipped and the partner has been notified that they have been funded for the transaction, the partner initiates payment to the seller via a seller disbursement file. It can be appreciated that if sellers deliver good digitally, the process whereby the seller of digital goods advises the partner that the goods have been shipped occurs automatically.

In the preferred embodiment, the seller disbursement file contains one net deposit for each seller. Represented in the seller's net deposit may be multiple purchase and refund transactions, as well as charge backs, fees, and other amounts due. The net deposit could be negative if the amount of refunds, charge backs and/or fees owed exceeds the daily sales transactions.

In the preferred embodiment, and to provide maximum flexibility to manage customer's risk, payment flags or indicators that control seller disbursement are built at the seller level. Seller disbursement is controlled by the partner. The data is housed on the partner's system and is accessible by a proprietary risk group responsible for risk reviewing and decision making.

In the one preferred embodiment, individual flags are set on the partner's system to indicate timing of disbursement. Default settings are established systematically at the partner's level to provide flexibility for different types of scenarios and risk tolerances. Based on different risks associated with each payment type, i.e. credit card versus eCheck, the system has different flags for each payment type. Flags comprise, but are by no means limited to:

Should the merchant be funded? Default is flag is set to yes, and is no under extreme circumstances;

Number of days funding should be delayed after the day the transaction is settled Amount of reserve accumulated prior to paying any funds to seller, wherein if the field is zero, then no reserve accumulated. Reserve should be either a flat dollar amount, a percentage of sales, or a percentage of sales with a cap on the reserve amount.

A maximum payment amount that can not be exceeded without override approval of the proprietary risk group. The system is built to release such large deposits after a predetermined number of days, if no action is taken.

If the proprietary risk group identifies a change to a customer or seller's risk profile that makes the risk unacceptably high, the disbursement flag is turned off, the number of days increased or a reserve is withheld. Such changes need to occur in real time and must impact the day's disbursement file. Prior to initiating seller disbursement each day, the partner's system must query such flags to ensure proper action is being taken.

The partner transmits an end-of-day seller disbursement batch file to said invention claimed herein comprising the decision engine, before a predetermined cutoff time, notifying which sellers need to be funded and for how much.

The invention returns an acknowledgement file to the partner. The acknowledgement file lets the partner know which seller disbursement transactions, if any, failed special edit routines of the invention claimed herein, wherein special edit rules are applied prior to completing the transaction, to ensure that a valid transaction has been transmitted from the merchant or partner to the decisioning engine.

In the preferred embodiment, the accepted transactions from the seller disbursement file are reformatted into NACHA format and the file is submitted to the proprietary ACH system of the claimed invention.

The seller disbursement batch file, the seller disbursement acknowledgement file, and the ACH file are logged for future reference. If the proprietary ACH receives an ACH reject for any reason, the reject is returned to the invention claimed herein and can be passed to the merchant in the beginning of day (BOD) file. This allows for correction and possible resubmission of the transaction Settlement Overview for Credit Cards.

In one embodiment, purchase information via credit cards can be stored. No decision is made. A minimal response is returned to the customer to acknowledge receipt of the credit card transaction. There is a flag at the partner source level with a Yes or No indicator to identify whether or not full processing capabilities are required. In the preferred embodiment, where full credit card processing functionality is being provided, the partner's system creates a daily batch settlement file at the end of every day. This file contains all transactions identified by the partner's clients and/or sellers as ready to settle, i.e. meaning the goods have been shipped to the buyer, as well as any returns. This settlement file is transmitted to the invention claimed herein by a predetermined time each day, typically 4 pm Pacific time, Monday through Friday. The information sent from the partner is taken and an FDMS formatted settlement file is created. This FDMS formatted file needs to be sent to FDMS by predetermined times, such as, by 5 pm pacific time, 7 pm central standard time, for FDMS nightly processing Monday through Friday only. In the preferred embodiment, files containing Saturday's and Sunday's transactions are sent to FDMS with Monday's settlement file and processed by FDMS on Monday night, A copy of the files is sent to proprietary financial operations support.

In the preferred embodiment, one record is needed on this file for every credit card transaction that is approved and is ready to settle. In addition, a record needs to be created for each return. Required data in the preferred embodiment for each transaction ready to settle or for each return are, but are not limited to, source ID, order ID, merchant ID, seller ID, return/settlement indicator, and return amount.

Integrate with Merchant's Web Page.

In the preferred embodiment, proprietary message unit architecture provides for smooth integration with and online messaging to and from the merchant. The invention comprises real time, 5 second decisioning, as well as batch processing. Batch process architecture provides for timely processing of transactional level reconciliation information for both originations and exception items. Five second decisioning is used for both the registration process and for credit card and electronic check transactions. Both domestic and international payments for both credit card and electronic check are accepted. Finally, integration or interfacing with the merchant's Web page can be through personal computer (PC) or wireless technology.

It is noted that integrating with the merchant's Web page has a plug and play quality, because this feature of the invention claimed herein consists of required fields. The preferred embodiment works with a variety of front ends, and is independent of design of a merchant's front end.

It is noted that the invention claimed herein provides for integrating with merchant's Web page in real time.

It is noted that the ACH method of reconciliation and the matching process to the original transaction is a unique feature.

Report Suspicious Activity to the Merchant.

In the preferred embodiment, It can be appreciated that risk programs available in the market, or proprietary risk assessment rules and algorithms can be used in the invention claimed here. The invention provides for alerting to the merchant suspicious activity, such as, for example by alert reports. It can be appreciated that the invention provides for additional decisioning and fraud-screening intra-day, i.e. after the 5 second decisioning.

The process to initiate transaction reversals or refunds is sometimes due to detected fraud. Two modes of evaluating a message for fraudulent activity, otherwise known as authenticating transactions, are:

5 second, or real time response in order to stop a fraudulent transaction;

update a 5 second response with output from an intraday fraud detection process, in order to stop a fraudulent transaction; and Intraday Fraud Detection.

In the preferred embodiment, Intraday fraud detection encompasses all fraud detection efforts that are performed after a 5-second decision has been returned to a partner on a purchase or enrollment request. It can occur minutes after the transaction is complete or even days later.

Intraday Fraud Process.

In one preferred embodiment, every two hours new purchase and enrollment data is downloaded from a mainframe and loaded into SAS files in Unix. A number of SAS queries are created to detect irregular transaction activity. These queries generate reports that are then e-mailed to appropriate staff on a regular basis for follow up. Another alternative is to have the SAS queries processed directly on the mainframe.

The preferred embodiment allows for new detection methods to be constantly added and tested to standard intraday reporting processes. The decisioning engine support environment communicates to the merchant via call or e-mail when a fraud has been discovered on an ad-hoc basis.

In one preferred embodiment, merchant fraud analysts determine that fraud has occurred or that sufficient fraud risk exists, and they proceed with their standard processes for notifying the seller or buyer, and withhold funding as appropriate.

Following are detection processes provided by a preferred embodiment, according to the invention:

eCheck Reversals. Functionality to stop fraudulent eCheck purchases from being sent to ACH if caught before the 4 pm ACH cutoff;

eCheck Stops. Functionality to undo an eCheck purchase by crediting the buyer and not funding the seller for the transaction amount, if the fraud is detected after the Day 0-4 pm ACH cutoff but before the Day 3 Beginning of Day (BOD) file has been sent to the merchant;

Simple user interface screens. To execute the above mentioned functions;

i-Fraud Database. A fraud database; and

Charge back data collection. Capture charge back data in the Intraday downloads to a support environment.

It can be appreciated that additional risk assessments and substantial refinements in the analysis of fraud activity can be added to the claimed invention herein without deviating from the scope and spirit of the invention.

Decisioning Engine.

The decision engine is an online interactive subsystem. In the preferred embodiment, an initial decision takes place within 5 seconds. The 5 second lookup subsystem comprises, but is not limited to making a decision on a transaction and/or a registration; notifying the appropriate partner of the decision; and sending qualified transactions to the ACH.

In the preferred embodiment, the architecture is sufficiently open to accommodate a variety of partners, and to allow for additional data elements, data file comparisons, and other risk processes. In another embodiment, the architecture also allows for user adjustment of risk element weighting, and could use user defined risk element tables, rather than hard coded risk weighting.

In the preferred embodiment, the claimed invention herein is the originator of ACH debits. Funds settle in an operating account for which to fund customer accounts, but not message the customer on accept or decline.

The ACH clock begins with Day 0, when transactions are submitted to the invention. The invention assumes any risk for any returned items after a predetermined day, which, in the preferred embodiment, is Day 3. In the preferred embodiment, transaction logs for ACH returns are updated and corresponding information is communicated to the customer. Late returns are also tracked.

It can be appreciated that risk management criteria that are proprietary, as well as risk management criteria that are from conventional programs can be used to determine, quantify, and qualify risk of potential buyers and sellers. Basically, risk assessment processes are used to indicate by means of a flag, or the like, potential risks by determining and then using the following: suspicious amounts of transactions, suspicious personal information of buyers or sellers, suspicious activities of buyers or sellers, conventional statistical information and conventional modes of operation of end-consumers.

Merchant to Indicate to Seller Approval for Shipment of Goods and Services.

Merchant indicating approval for shipment of goods and services is also known as "okay to ship." In the preferred embodiment of the invention, risk analysis for transaction decisions as disclosed herein above is used. This feature of the claimed invention controls loss exposure for merchants. In addition, means for guaranteeing payment to the merchant after shipment of goods and services and insurance against fraud after shipment of goods are provided.

In another preferred embodiment, risk parameters for velocity and spending limits on transactions for merchants are identified.

Providing to Merchant a Decision to Transact with Buyer Based on a Determined Risk of Buyer.

In the preferred embodiment, online 5 second decisioning is used. In another embodiment, additional Intraday review for fraud is applied to the transaction related information. Decision criteria are updated as transaction knowledge is gained. Stored transaction data is used for future decisions. Additionally, the shipment of goods and services from the merchant to the end-consumer is guaranteed and insurance is provided against fraud after payment is received.

Figure 1:
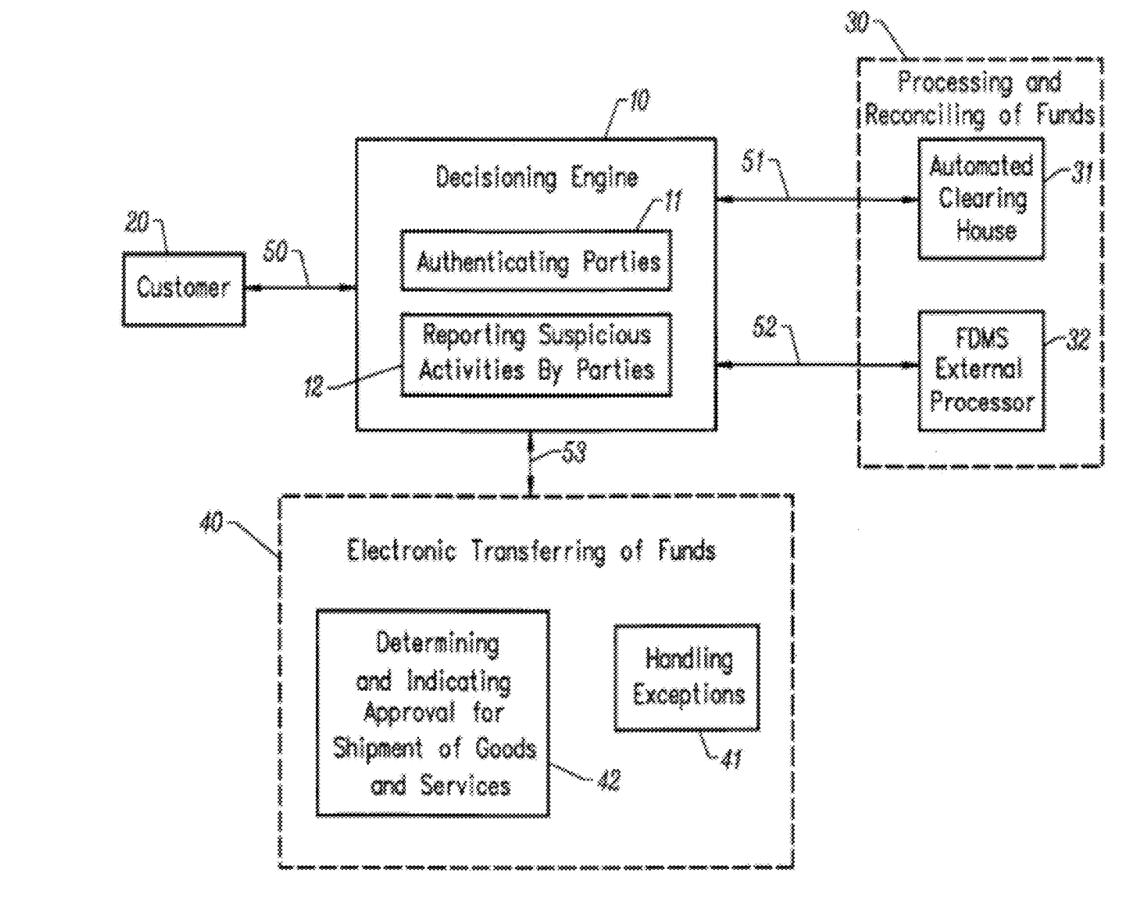
FIG. 1 shows a schematic block diagram of the main components of a preferred embodiment, according to the invention.

FIG. 1 shows a schematic block diagram of main components, according to the invention. The preferred embodiment of the invention comprises a decisioning engine 10 for providing a decisioning solution to a customer 20. It also comprises means for processing and reconciling funds 30, and means for providing electronic transferring of funds 40, thereby facilitating processing of payments for the customer 20. The means for processing and reconciling of funds further comprises an internal processor, the Automated Clearing House 31, and the external processor, FDMS 32. The means for electronic transferring of funds further comprises means for handling exceptions 41, and means for determining and indicating to the customer approval for shipment of goods and services 42. The decisioning engine 10 further comprises means for authenticating participating parties 11, and means for reporting to said customer suspicious activity by the parties 12. The decisioning engine 10 interfaces and integrates seamlessly with the customer's Web page in both real time and batch processing 50. Typically, the decisioning engine communicates with the ACH 31 and external processor 32 by batch processing 51 and 52, respectively. The decisioning engine 10 communicates with the means for electronic transferring of funds in both real time and batch processing 53.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method of providing a transaction authorization decision solution to a merchant-acquirer and facilitating processing of payments between participating parties and the merchant-acquirer, the method comprising:

receiving, at an enterprise decision engine operating at an apparatus, a transaction authorization request from the merchant-acquirer via a network, the transaction authorization request specifying an electronic transaction between a buyer and a seller, the seller being one of the participating parties, the participating parties being parties that use the merchant-acquirer to process electronic transactions, the electronic transaction requiring shipment of goods or services from the seller to the buyer;

in response to receiving the transaction authorization request, automatically performing, at the enterprise decision engine, a risk analysis to determine whether to authorize the electronic transaction;

after performing the risk analysis, automatically sending, by the enterprise decision engine, a transaction authorization response to the merchant-acquirer via the network, the transaction authorization response indicating whether the enterprise decision engine authorizes the electronic transaction;

automatically providing, by the enterprise decision engine, a guarantee of payment to the merchant-acquirer for the electronic transaction when the enterprise decision engine authorizes the electronic transaction;

automatically providing, by the enterprise decision engine, insurance to the merchant-acquirer against fraud when the enterprise decision engine authorizes the electronic transaction;

after sending the transaction authorization response to the merchant-acquirer, receiving, at the enterprise decision engine, a file, the file containing an original entry indicating an amount of money to be deposited by the merchant-acquirer in an account of the seller, the amount of money based at least in part on the electronic transaction;

in response to receiving the file, automatically converting, at the enterprise decision engine, the original entry to an Automated Clearing House (ACH) entry when the original entry is based on an electronic check;

in response to receiving the file, automatically converting, at the enterprise decision engine, the original entry to a First Data Merchant Services (FDMS)-formatted entry when the original entry is based on a credit card transaction;

automatically submitting, by the enterprise decision engine, the ACH entry to an ACH system when the original entry is based on the electronic check; and automatically submitting, by the enterprise decision engine, the FDMS-formatted entry to an external processor when the original entry is based on the credit card transaction.

2. The method of claim 1, where the file is an end-of-day seller disbursement batch file.

3. The method of claim 2, further comprising in response to receiving the end-of-day seller disbursement file, automatically sending, by the enterprise decision engine, an acknowledgement file to the merchant-acquirer, the acknowledgment file indicating to the merchant-acquirer failed seller disbursement transactions.

4. The method of claim 3, wherein the end-of-day seller disbursement batch file comprises a net debit for each of the participating parties.

5. The method of claim 1, wherein submitting the ACH entry comprises originating, by the enterprise decision engine, an ACH debit.

6. The method of claim 1, wherein the file is a daily batch settlement file, the daily batch settlement file containing all credit card transactions identified by the seller as ready to settle.

7. The method of claim 6, the daily batch settlement file containing for each of the credit card transactions a source identifier, an order identifier, a merchant identifier, a seller identifier, a return/settlement indicator, and an amount.

8. The method of claim 1, wherein automatically performing risk analysis to determine whether to authorize the electronic transaction comprises automatically performing risk analysis to determine whether to authorize the electronic transaction in approximately five seconds or less.

9. The method of claim 1,
wherein the risk analysis to determine whether to authorize the electronic transaction is a first risk analysis;
wherein the method further comprises:
prior to receiving the transaction authorization request, receiving, at the enterprise decision engine, a first registration request from the buyer; and
in response to the first registration request, performing, at the enterprise decision engine, a second risk analysis to determine risk of the buyer; and
wherein performing the first risk analysis comprises performing, at the enterprise decision engine, the first risk analysis based further on the risk of the buyer.

10. The method of claim 9, wherein performing the second risk analysis comprises determining, at the enterprise decision engine, whether the buyer is too good to be true.

11. The method of claim 9,
wherein the method further comprises:
prior to receiving the transaction authorization request, receiving, at the enterprise decision engine, a second registration request from the seller; and
in response to the second registration request, performing, at the enterprise decision engine, a third risk analysis to determine risk of the seller; and
wherein performing the first risk analysis comprises automatically performing, at the enterprise decision engine, the first risk analysis based further on the risk of the seller.

12. The method of claim 1, wherein automatically performing the risk analysis comprises declining the electronic transaction in response to detecting suspicious activity.

13. The method of claim 1, further comprising performing, at the enterprise decision engine, an intra-day fraud detection process.

14. The method of claim 1, wherein performing the risk analysis comprises performing, at the enterprise decision engine, the risk analysis based at least in part on a gross monthly volume of the seller, a length of time the seller has been with the merchant-acquirer, and a feedback rating by the merchant-acquirer.

* * * * *